United States Patent [19]
Clare et al.

[11] Patent Number: 6,111,720
[45] Date of Patent: Aug. 29, 2000

[54] METHOD AND APPARATUS FOR PROVIDING SEPARATE READ/WRITE VELOCITY CURVES

[75] Inventors: Donald Lee Clare, Morgan Hill; Bernd Lamberts, Cupertino; Louis Joseph Serrano, San Jose, all of Calif.

[73] Assignee: International Business Machines Corporation, Armonk, N.Y.

[21] Appl. No.: 08/919,843

[22] Filed: Aug. 28, 1997

[51] Int. Cl.[7] .................................................. G11B 5/596
[52] U.S. Cl. .................................. 360/78.06; 360/78.04; 360/78.07
[58] Field of Search .............................. 360/78.06, 78.07, 360/78.04

[56] References Cited

U.S. PATENT DOCUMENTS

| | | | |
|---|---|---|---|
| 4,591,933 | 5/1986 | Quackenbush | 360/78.07 |
| 4,982,298 | 1/1991 | Volz et al. | 360/78.06 |
| 5,150,266 | 9/1992 | Albert | 360/78.04 |
| 6,002,544 | 12/1999 | Yatsu | 360/78.09 |

FOREIGN PATENT DOCUMENTS 5-258487  10/1993  Japan .

OTHER PUBLICATIONS

Translation of JP 5258487A, 1993.

*Primary Examiner*—Paul Loomis
*Assistant Examiner*—Dan I. Davidson
*Attorney, Agent, or Firm*—Altera Law Group, LLC

[57] ABSTRACT

A computer disk drive unit having a control system that uses a separate velocity profile for read seeks and for write seeks is disclosed. Appropriate velocity profiles are provided according to whether a seek operation is a read seek operation or a write seek operation. The control system includes a memory for storing an initial velocity profile and a processor for determining whether a read seek operation or a write seek operation is to be performed. The processor obtains the initial velocity profile from memory to produce a read velocity profile or a write velocity profile. The processor multiplies the velocity profile obtain from the memory by a predetermined constant to derive the read velocity profile when the processor determines that a read operation is to be performed. Then the processor repositions the head according to the write velocity profile or the read velocity profile. The processor may also multiply the initial velocity profile by a write profile coefficient to obtain the write velocity profile. A monitor may be provided for monitoring disk drive performance parameters and providing the processor with data concerning the performance parameters, wherein the processor enforces utilization of the write profile when the data concerning the performance parameters meet a predetermined criteria. The predetermined criteria may include an excessive overshoot condition.

24 Claims, 6 Drawing Sheets

METHOD AND APPARATUS FOR PROVIDING SEPARATE READ/WRITE VELOCITY CURVES

BACKGROUND OF THE INVENTION

1. Field of the Invention

This invention relates in general to computer disk drives, and more particularly to a method and apparatus for providing separate velocity profiles for read and write seeks.

2. Description of Related Art

In recent years microcomputer equipment such as personal or desk top computers have become extremely popular for a wide range of business, educational, recreational and other uses. Such computers typically include a main central processor having one or more memory storage disks for storage of data. The storage disk or disks are commonly provided as part of a so-called Winchester disk drive unit, sometimes referred to as a "hard" disk, wherein the storage disks are rotatably supported within a substantially sealed housing. The disks are rotatably driven in unison by a small spindle motor, and one or more electromagnetic heads are displaced by a head actuator assembly to traverse surfaces of the disks for purposes of reading and writing data. Such data is recorded onto magnetizable surfaces or surface films of the disks in the form of data bits located within narrow, closely spaced concentric tracks on the disks. Accordingly, for any given disk drive unit, the total memory storage capacity is directly proportional to the number of disks as well as the number of tracks on each disk.

In normal operations, a system controller of the main central processor has the capability to identify data stored by recording on the disks, typically through the use of directory name, file, name, and/or track address information. When reading of data at a specified data track is desired, the system controller displaces the head or heads to the desired position by supplying appropriate command signals to operate the head actuator assembly. Alternately, when data recording or writing is desired, the system controller operates the actuator assembly to align a selected head with a vacant data track. In either case, the head actuator assembly is commanded to displace the head or heads through a generally radial path relative to the disk for moving each head from alignment with a previously selected track to alignment with the newly selected destination track. Such movement of the head is normally referred to as a "seek" step.

Servo positioning systems have been widely employed for quickly and accurately positioning the mechanical element, such as a magnetic head of a magnetic recording disk apparatus. A typical servo control system for a recording disk apparatus includes a controller for generating a velocity signal based upon a position signal obtained from a servo signal generated by a magnetic head.

The position signal indicates the radial position of the magnetic head relative to the adjacent track and is generally designed to be zero when the head is at the center of a track being traced. The controller calculates the number of tracks needed to be jumped according to command from a host processor unit.

For optimum disk drive unit performance, it is desirable to displace the head or heads through each seek step in a minimum time period consistent with accurate head alignment with the destination track. Alternately stated, it is desirable to displace the head from one track to another at the fastest possible speed, including the fastest possible acceleration and deceleration without incurring a seek error.

However, the selection of a specific velocity profile during a seek step requires consideration of a wide range of electrical and mechanical design factors, some of which are subject to significant variations over time and/or from one computer to another. For example, temperature, mechanical stiffness of the actuator assembly, power supply voltage, etc. are subject to variations which can affect the optimum seek velocity profile without errors.

In the past, these design factors have been accommodated by selecting a seek velocity profile in accordance with a worst case condition, thereby minimizing or avoiding seek errors. Unfortunately, this approach results in a failure to utilize an optimized velocity profile for achieving minimum seek times during most normal operating conditions. For example, no distinction is made between read seeks and write seeks despite the fact that read seeks incur more errors that are induced by faster seek times, e.g., head positioning after seek.

There exists, therefore, a significant need for a relatively simple yet effective system for selecting a substantially optimized seek velocity profile of a disk drive unit.

It can be seen then that there is a need for a computer disk drive unit having a control system that uses a separate velocity profile for read seeks and for write seeks.

It can also be seen that there is a need for a control system having a write seek velocity profile that reduces random transient vibrations.

It can also be seen that there is a need for a control system having a more aggressive read seek profile since random transient vibrations and settle time are not critical.

SUMMARY OF THE INVENTION

To overcome the limitations in the prior art described above, and to overcome other limitations that will become apparent upon reading and understanding the present specification, the present invention discloses a computer disk drive unit having a control system that uses a separate velocity profile for read seeks and for write seeks.

The present invention solves the above-described problems by providing appropriate velocity profiles according to whether a seek operation is a read seek operation or a write seek operation.

A data storage system in accordance with the principles of the present invention includes a hardware plant including an actuator assembly and a disk assembly having a recording disk, the actuator assembly moving a head relative to the disk assembly to write and read data to and from the disk assembly, read/write channel electronics for sending and receiving data from the disk assembly; a spindle control/drive unit for controlling the rotations of a disk and an actuator controller for controlling movement of the head through a succession of seek steps according to velocity profiles. The actuator controller includes a memory for storing an initial velocity profile and a processor for determining a type of seek operation to be performed, wherein the type of seek operation comprises either a read seek operation or a write seek operation, and for obtaining the initial velocity profile from memory to produce a read velocity profile or a write velocity profile. The processor multiplies the velocity profile obtain from the memory by a predetermined constant to derive the read velocity profile when the processor determines that a read operation is to be performed. Then the processor repositions the head according to the write velocity profile or the read velocity profile.

Other embodiments of a system in accordance with the principles of the invention may include alternative or optional additional aspects. One such aspect of the present invention is that the processor multiplies the initial velocity profile by a write profile coefficient to obtain the write velocity profile.

Another aspect of the present invention is that a monitor is provided for monitoring disk drive performance parameters and providing the processor with data concerning the performance parameters, wherein the processor enforces utilization of the write profile when the data concerning the performance parameters meet a predetermined criteria.

Another aspect of the present invention is that the predetermined criteria comprises an excessive overshoot condition.

In another embodiment of the present invention, an actuator controller includes a memory for storing separate velocity profiles for read seek operations and for write seek operations and a processor for determining the type of seek operation to be performed, the type of seek operation comprising either a read seek operation or a write seek operation, the processor selecting the appropriate velocity profile for execution in response to the determination of the type of seek operation.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a computer disk drive unit having a control system that uses a separate velocity profile for read seeks and for write seeks.

Figure 1:
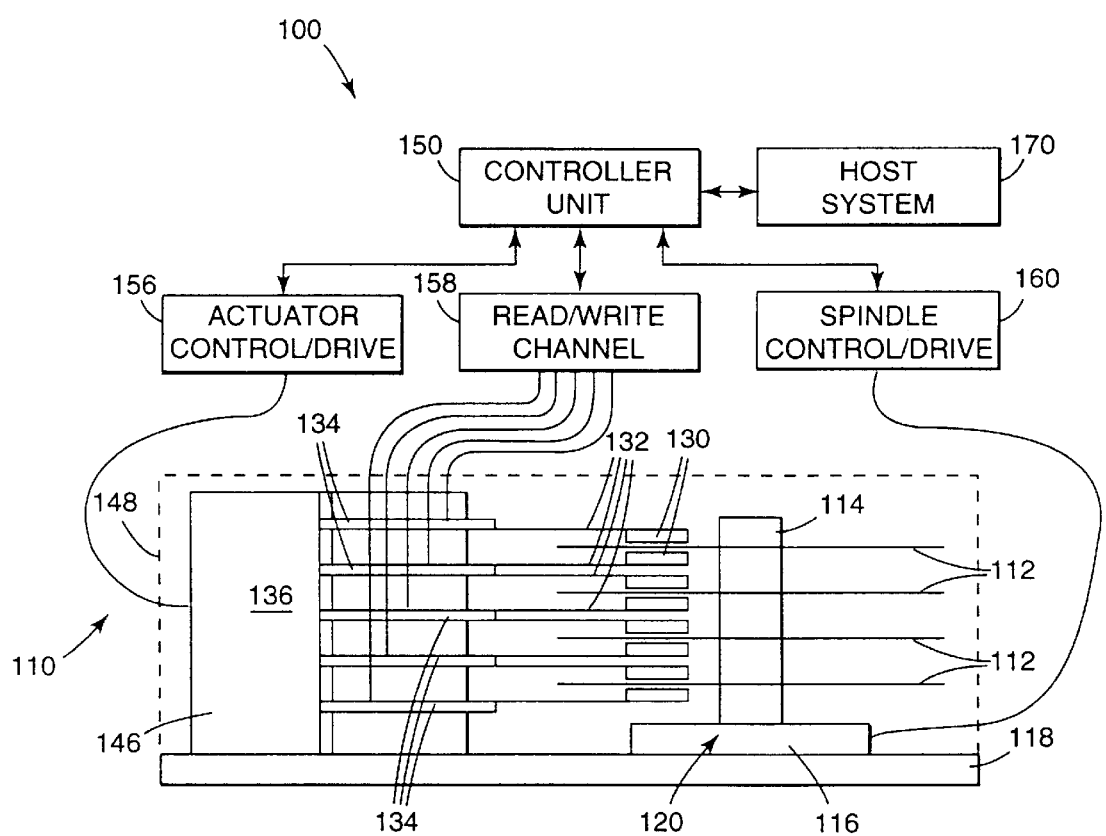
FIG. 1 shows a schematic diagram of a data storage system of the present invention.

FIG. 1 shows a schematic diagram of a data storage system of the present invention that is designated by the general reference number 100. System 100 includes a hardware plant 110. The hardware plant 110 comprises a disk assembly 120 and an actuator assembly 146. The disk assembly 120 includes a plurality of disks 112, a spindle 114, and a motor 116. However, those skilled in the art will recognize that disk assembly may only include a signal recording medium.

Each disk has a plurality of concentric data tracks. Disks 112 are mounted on the spindle motor shaft 114 which is connected to the spindle motor 116. Motor 116 is mounted to a chassis 118.

The actuator arm assembly 128 includes a plurality of sliders 130 having read/write heads are positioned over the disks 112 such that each surface of the disks 112 has a corresponding slider 130. Each slider 130 is attached to one of the plurality of suspensions 132 which in turn are attached to a plurality of actuator arms 134.

The actuator arm assemblies 128 are connected to a rotary actuator 136. Alternatively, the actuator arm assemblies 128 may be an integral part of a rotary actuator comb. Actuator 136 moves the heads in a radial direction across disks 112. Actuator 136 is mounted to chassis 118. Although a rotary actuator is shown in the preferred embodiment, a linear actuator could also be used. The actuator arm assemblies 128 including sliders 130, suspensions 132, and arms 134, and the actuator 136 comprise an actuator assembly 146. The disk stack assembly 120 and the actuator assembly 146 are sealed in an enclosure 148 (shown by dashed line) which provides protection from particulate contamination.

A controller unit 150 provides overall control to system 100. Controller unit 150 typically contains a central a processing unit (CPU), memory unit and other digital circuitry. Controller 150 is connected to an actuator control/drive unit 156 which in turn is connected to actuator 136. This allows controller 150 to control the movement of sliders 130 over disks 112. The controller 150 is connected to a read/write channel electronics 158 which in turn is connected to the heads of the sliders 130. This allows controller 150 to send and receive data from the disks 112. Controller 150 is also connected to a spindle control/drive unit 160 which in turn is connected to spindle motor 116. This allows controller 150 to control the rotation of disks 112.

A host system 170, which is typically a computer system, is connected to the controller unit 150. System 170 may send digital data to controller 150 to be stored disks 112, or may request that digital data be read from disks 112 and sent to the system 170.

Figure 2:
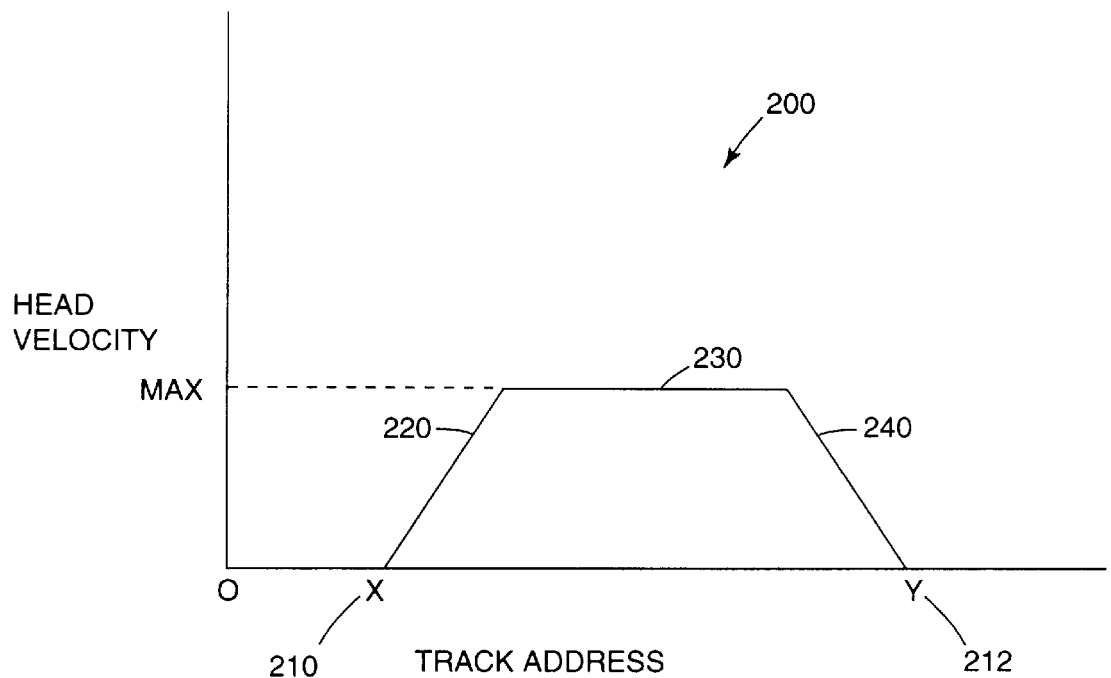
FIG. 2 illustrates an example of a velocity profile for a head in the course of a seek step.

FIG. 2 illustrates one example of a velocity profile 200 for a head in the course of a seek step involving head displacement from alignment with a prior track "X" 210 to alignment with a new destination track "Y" 212. When a seek step is desired, the microcontroller signals the head actuator assembly to displace the head from the "X" position 210 in a selected direction for alignment with the destination track "Y" 212. In this regard, other than initial calibration mode functions when the computer is turned on, the microcontroller normally responds to commands from the main system controller. The direction and magnitude of head displacement will depend, of course, upon the relative locations of the tracks "X" 210 and "Y" 212, with a typical storage disk having about 1,000 to 1,500 tracks.

In any case, the head is initially accelerated, as shown in FIG. 2, with increasing velocity from track "X" 210 through an acceleration phase 220 to a maximum velocity phase 230, followed by an appropriate deceleration phase 240 during which the head velocity is reduced as the head approaches and stops in substantially centered alignment with the destination track "Y" 212. If the selected velocity profile is too great, significant overshoot of the desired track "Y" can occur. However, if the selected velocity profile is too small, the seek time will not be minimized. For example, the write seek velocity profile can be slower to reduce random transient vibrations, whereas the read seek profile can be more aggressive since random transient vibrations and settle time do not matter.

Figure 3:
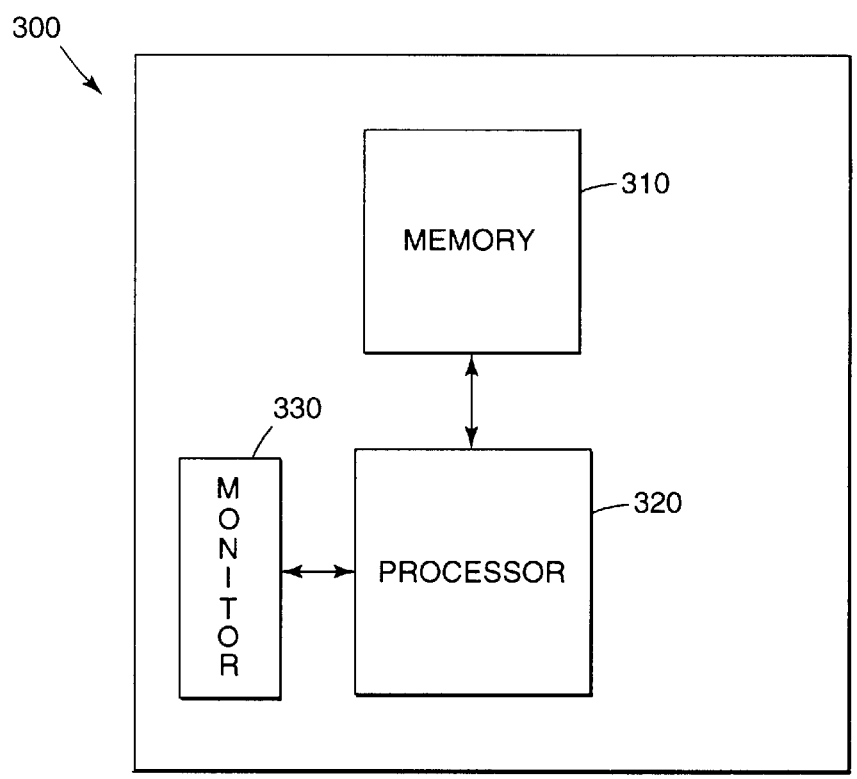
FIG. 3 illustrates a block diagram of a controller according to the present invention.

FIG. 3 illustrates a block diagram of a controller 300 according to the present invention. In FIG. 3, the controller 300 includes a memory 310 for storing different velocity profiles. A processor 320 accesses the memory 310 to retrieve appropriate velocity profiles. The processor 320 implements the velocity profile by controlling an actuator unit as shown in FIG. 1. Thus, the controller 300 may control the movement of sliders over a disk according to the selected velocity profile.

In addition, FIG. 3 illustrates a monitor 330 that monitors disk drive parameters to decide if the monitored criteria dictate modifications to the velocity profile selection. For example, the monitor may be used to decide when to use the write profile rather than the read profile. By using a monitor to decide when to use the write profile rather than the read profile, the appropriate velocity profile may be employed. Data concerning the storage device are provided to the processor 320. The processor 320 determines whether to use the write velocity profile or the read velocity profile. If the processor determines that the write velocity profile should be used rather than the read velocity profile, the processor enforces the use of the write velocity profile. Otherwise, the determination of the appropriate velocity profile is performed according to normal processes.

Figure 4:
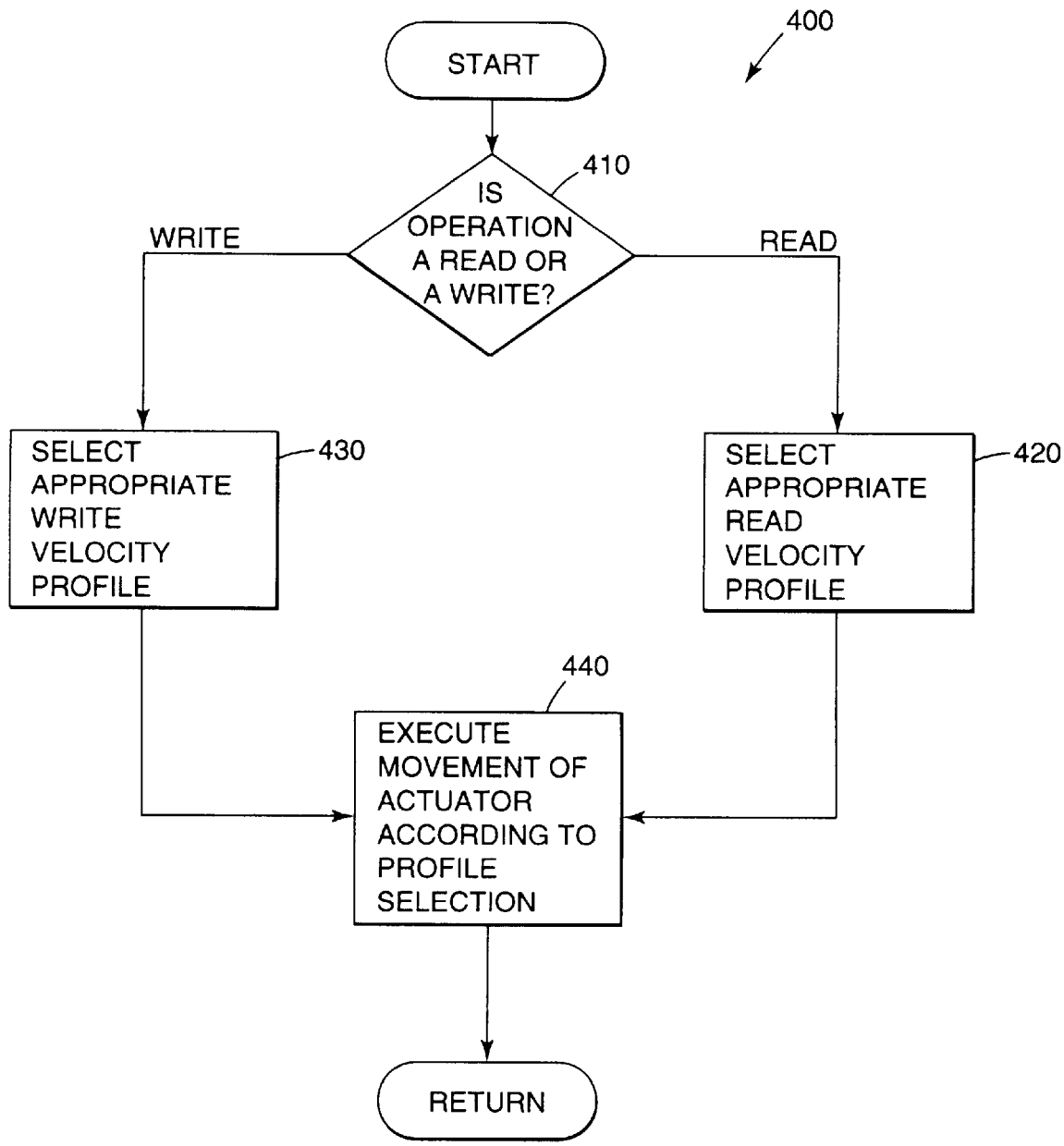
FIG. 4 illustrates a flow chart of one embodiment of the present invention wherein separate velocity profiles are stored and selected according to the type of operation.

FIG. 4 illustrates a flow chart of one embodiment 400 of the present invention wherein separate velocity profiles are stored and selected according to the type of operation. In implementing the velocity profiles, a processor determines 410 whether an operation is a read operation or a write operation. Then the processor may select 420, 430 specific velocity profiles for the appropriate seek operation, i.e., a read velocity profile for a read seek operation 420 or a write velocity profile for a write seek operation 430. After the appropriate velocity profile has been selected, the processor commands the actuator movement to reposition the head 440.

Figure 5:
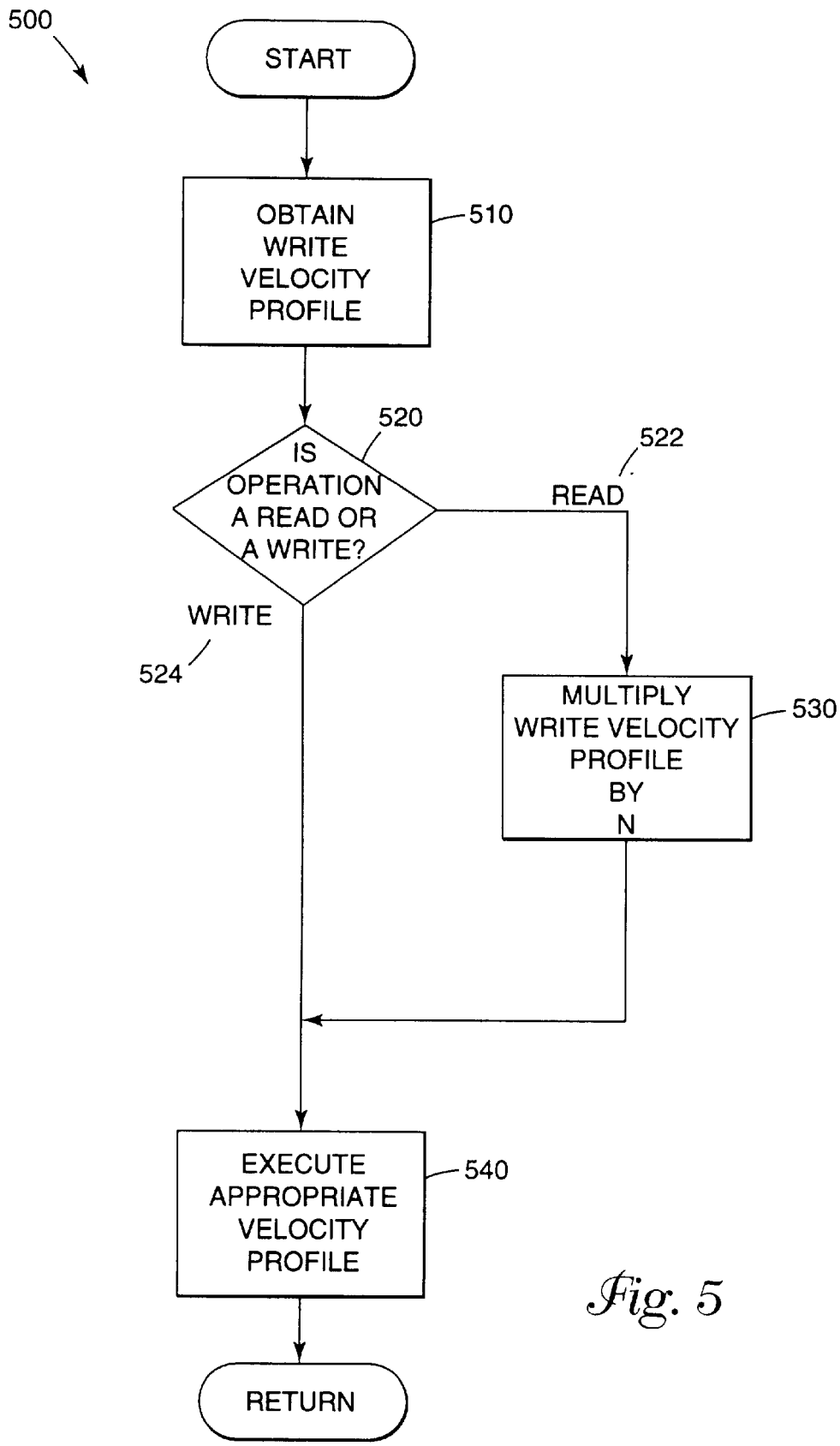
FIG. 5 illustrates a flow chart of an alternative embodiment of the present invention wherein only write velocity profiles are stored in the memory.

FIG. 5 illustrates a flow chart of an alternative embodiment 500 of the present invention wherein only write velocity profiles are stored in the memory. The processor obtains the write velocity profile 510 and determines whether the operation is a read seek operation or a write seek operation 520. If the operation is a read seek operation 522, the write velocity profile is multiplied by a predetermined constant N to derive the read velocity profile 530. The predetermined constant N may be modified according to disk drive conditions. The processor will then execute the calculated read velocity profile 540. If the operations is a write seek operation 524, then the processor simply executes the write velocity profile 540.

Figure 6:
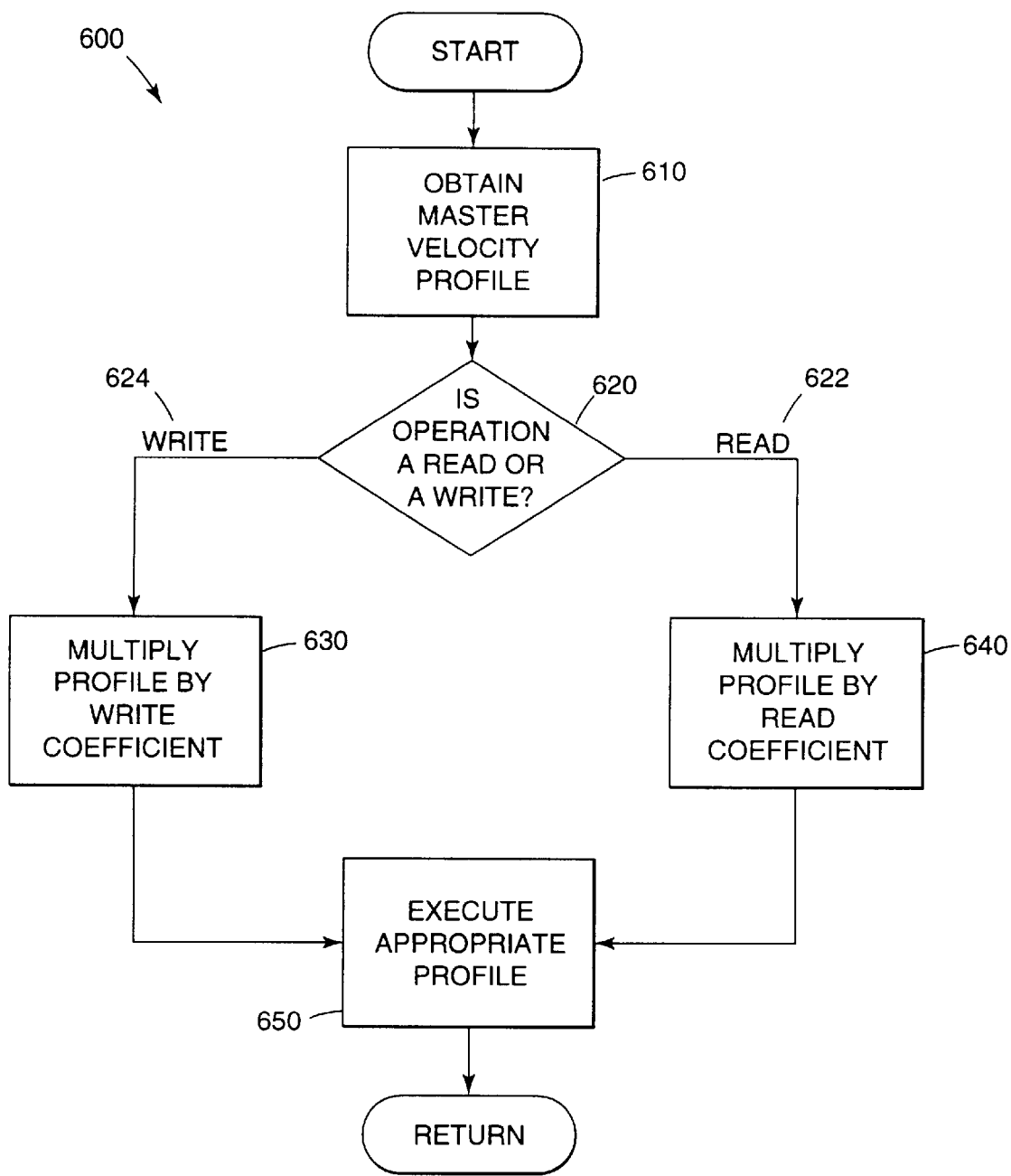
FIG. 6 illustrates a flow chart of another embodiment of the present invention wherein separate multipliers are used for read and write seek operations.

FIG. 6 illustrates a flow chart of another embodiment 600 of the present invention wherein separate multipliers are used for read and write seek operations. In FIG. 6, the processor obtains a master velocity profile from memory 610. The processor determines if the operation is a read seek operation or a write seek operation 620. If the operation is a write seek operation 622, the master velocity profile is multiplied by a write coefficient A 630. If the operation is a read seek operation 624, the master velocity profile is multiplied by a read coefficient B 640. Both coefficients, A and B, may be modified according to disk drive conditions. After obtaining the proper velocity profile product, the processor commands the actuator movement to reposition the head 650.

With two multipliers, the write seek can be derated as required to meet the random transient vibration specifications and/or write inhibit goal, while the read seek need only be derated to prevent overshoot due to environmental conditions. In this way, the read performance is not reduced to improve the write performance. Alternatively, two separate velocity profiles and two separate derating factors can be used.

Figure 7:
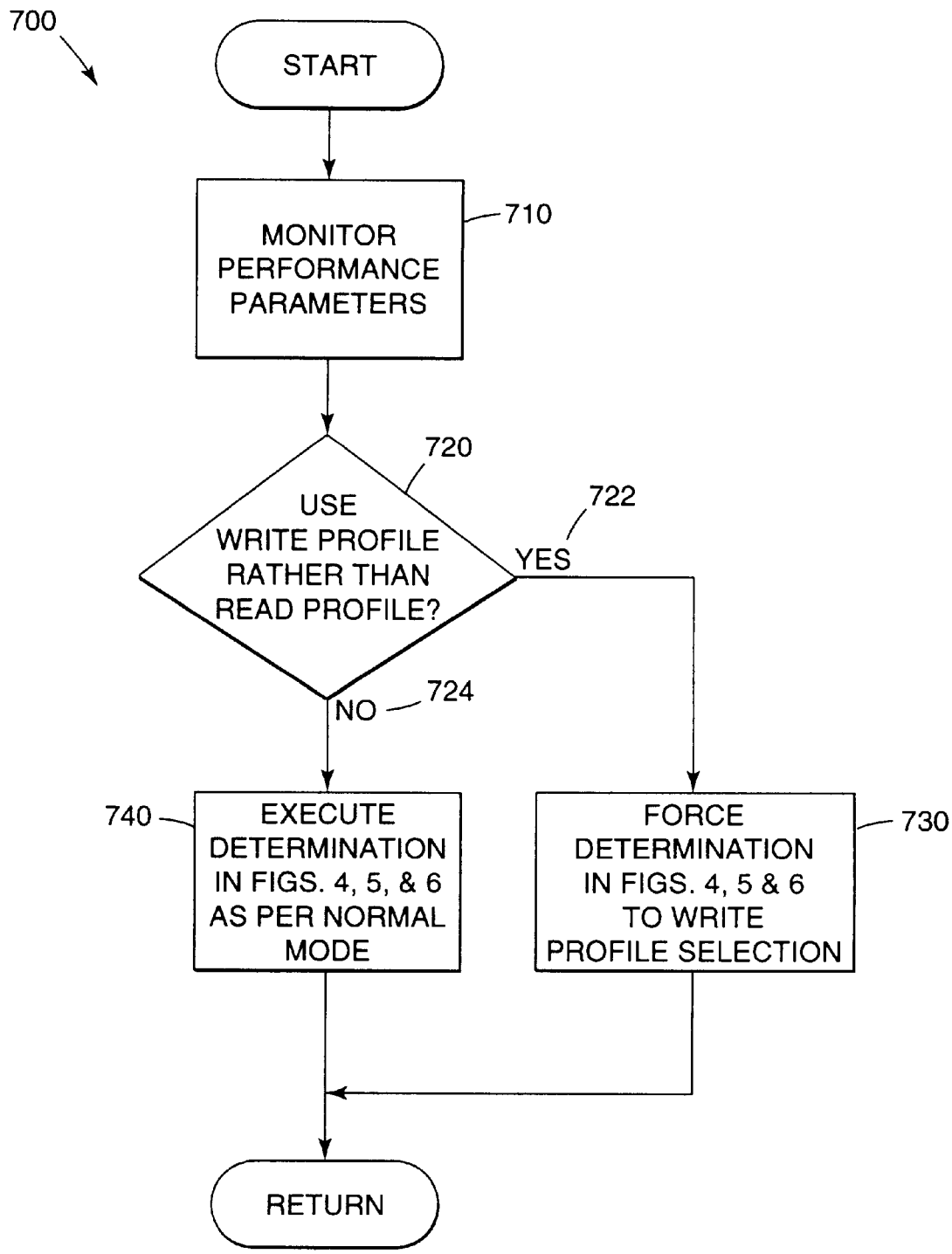
FIG. 7 illustrates a flow chart of another embodiment of the present invention wherein a monitor is used to decide if predetermined criteria dictate modifications to the velocity profile selection.

FIG. 7 illustrates a flow chart of another embodiment 700 of the present invention wherein a monitor is used to decide if predetermined criteria dictate modifications to the velocity profile selection. Since the read profile is more aggressive than the write profile, the read profile is more susceptible to degradation under certain environmental conditions. Accordingly, a monitor, e.g., an excessive overshoot condition monitor, may be used to decide when to use the write profile rather than the read profile. By using a monitor to decide when to use the write profile rather than the read profile, e.g., situations where the read move time exceeds the write move time such as in high temperature cases, the appropriate velocity profile may be employed.

In FIG. 7, performance parameters are monitored 710 and the processor determines whether to use the write velocity profile or the read velocity profile 720. If the processor determines that the write velocity profile should be used rather than the read velocity profile 722, the processor enforces the use of the write velocity profile 730. Otherwise 724, the determination of the appropriate velocity profile is performed according to normal processes 740.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An actuator controller for controlling movement of a head through a succession of seek steps according to velocity profiles, comprising:

a memory for storing an initial velocity profile for use as a basis for read seek operations and for write seek operations; and a processor, operatively coupled to the memory, for obtaining the initial velocity profile from memory, determining whether the type of seek operation to be performed is a read or a write, adjusting the obtained initial velocity profile according to a first coefficient to produce a read velocity profile for performing the seek when the type of seek operation is a read and executing the seek operation using the read velocity profile when the seek operation is a read and executing the seek operation using the initial velocity profile when the seek operation is a write.

2. The controller of claim 1 further comprising a monitor for monitoring disk drive performance parameters and providing the processor with data concerning the performance parameters, wherein the processor enforces utilization of the initial velocity profile for both write and read seek operations when the data concerning the performance parameters meet a predetermined criteria.

3. The controller of claim 2 wherein the predetermined criteria comprises an excessive overshoot condition.

4. An actuator controller for controlling movement of a head through a succession of seek steps according to velocity profiles, comprising:
  a memory for storing an initial velocity profile; and
  a processor, operatively coupled to the memory, for determining a type of seek operation to be performed, the type of seek operation comprising either a read seek operation or a write seek operation, the processor obtaining the initial velocity profile from memory to produce a read velocity profile or a write velocity profile, wherein the processor multiplies the initial velocity profile obtained from the memory by a read coefficient to derive the read velocity profile when the processor determines that a read operation is to be performed, and wherein the processor executes the seek operation using the read velocity profile when the seek operation is a read seek operation and executes the seek operation using the initial velocity profile when the seek operation is a write seek operation.

5. The controller of claim 4 wherein the initial velocity profile is a write velocity profile and the processor executes the write velocity profile when the seek operation is a write seek operation.

6. The controller of claim 5 further comprising a monitor for monitoring disk drive performance parameters and providing the processor with data concerning the performance parameters, wherein the processor adjusts the write velocity profile when the data concerning the performance parameters indicates excessive vibration.

7. The controller of claim 4 further comprising a monitor for monitoring disk drive performance parameters and providing the processor with data concerning the performance parameters, wherein the processor enforces utilization of the initial velocity profile for both read and write seek operations when the data concerning the performance parameters meet a predetermined criteria.

8. The controller of claim 7 wherein the predetermined criteria comprises an excessive overshoot condition.

9. The controller of claim 4 further comprising a monitor for monitoring disk drive performance parameters and providing the processor with data concerning the performance parameters, wherein the processor adjusts the read coefficient to derive the read velocity profile when the data concerning the performance parameters indicates an excessive overshoot condition.

10. A data storage system, comprising:
  a hardware plant including an actuator assembly and a disk assembly having a recording disk, the actuator assembly moving a head relative to the disk assembly to write and read data to and from the disk assembly;
  read/write channel electronics for sending and receiving data from the disk assembly;
  a spindle control/drive unit, operatively coupled to the disk assembly, for controlling the rotations of a disk; and
  an actuator controller for controlling movement of the head through a succession of seek steps according to velocity profiles, wherein the actuator controller further comprises:
    a memory for storing an initial velocity profile; and
    a processor, operatively coupled to the memory, for determining a type of seek operation to be performed, the type of seek operation comprising either a read seek operation or a write seek operation, the processor obtaining the initial velocity profile from memory to produce a read velocity profile or a write velocity profile, wherein the processor multiplies the initial velocity profile obtained from the memory by a read coefficient to derive the read velocity profile when the processor determines that a read operation is to be performed, and wherein the processor executes the seek operation using the read velocity profile when the seek operation is a read seek operation.

11. The data storage system of claim 10 wherein the processor multiplies the initial velocity profile by a write profile coefficient to obtain a write velocity profile and executes the write velocity profile when the seek operation is a write seek operation.

12. The data storage system of claim 11 further comprising a monitor for monitoring disk drive performance parameters and providing the processor with data concerning the performance parameters, wherein the processor adjusts the write profile coefficient to derive the write velocity profile when the data concerning the performance parameters indicates excessive vibration.

13. The data storage system of claim 10 further comprising a monitor for monitoring disk drive performance parameters and providing the processor with data concerning the performance parameters, wherein the processor enforces utilization of the initial velocity profile for both read and write seek operations when the data concerning the performance parameters meet a predetermined criteria.

14. The data storage system of claim 13 wherein the predetermined criteria comprises an excessive overshoot condition.

15. The data storage system of claim 10 further comprising a monitor for monitoring disk drive performance parameters and providing the processor with data concerning the performance parameters, wherein the processor adjusts the read coefficient to derive the read velocity profile when the data concerning the performance parameters indicates an excessive overshoot condition.

16. The data storage system of claim 10 wherein the processor executes the write seek using the initial velocity profile when the seek operation is a write seek operation.

17. A data storage system, comprising:
  a hardware plant including an actuator assembly and a disk assembly having a recording disk, the actuator assembly moving a head relative to the disk assembly to write and read data to and from the disk assembly;
  read/write channel electronics for sending and receiving data from the disk assembly;
  a spindle control/drive unit, operatively coupled to the disk assembly, for controlling the rotations of a disk; and
  an actuator controller for controlling movement of the head through a succession of seek steps according to velocity profiles, wherein the actuator controller further comprises:
    a memory for storing a velocity profile for use as a basis for read seek operations and for write seek operations; and
    a processor, operatively coupled to the memory, for determining a type of seek operation to be performed, the type of seek operation comprising either a read seek operation or a write seek operation, the processor obtaining the initial velocity profile from memory to produce a read velocity profile or a write velocity profile, wherein the processor multiplies the initial velocity profile obtained from the memory by a read coefficient to derive the read velocity profile when the processor determines that a read operation is to be performed, and wherein the processor executes the seek operation using the read velocity profile when the seek operation is a read seek operation and executes the seek operation using the initial velocity profile when the seek operation is a write seek operation.

18. The data storage system of claim 17 further comprising a monitor for monitoring disk drive performance parameters and providing the processor with data concerning the performance parameters, wherein the processor enforces utilization of the initial velocity profile for both read and write seek operations when the data concerning the performance parameters meet a predetermined criteria.

19. A method for providing velocity profiles for moving a head through a succession of seek steps relative to a storage medium, the method comprising the steps of:

storing an initial velocity profile;

determining a type of seek operation to be performed, the type of seek operation comprising either a read seek operation or a write seek operation;

obtaining the initial velocity profile to produce a read velocity profile or a write velocity profile;

multiplying the obtained initial velocity profile by a read coefficient to derive the read velocity profile when a read operation is to be performed; and executing the seek operation using the read velocity profile when the seek operation is a read seek operation.

20. The method of claim 19 further comprising the step of multiplying the initial velocity profile by a write profile coefficient to obtain a write velocity profile and executing the seek operation using the write velocity profile when the seek operation is a write seek operation.

21. The method of claim 19 further comprising the steps of:

monitoring disk drive performance parameters;

providing the processor with data concerning the performance parameters;

enforcing utilization of the initial velocity profile for both read and write seek operations when the data concerning the performance parameters meet a predetermined criteria.

22. The method of claim 19 further comprising the step of executing the seek operation using the initial velocity profile when the seek operation is a write seek operation.

23. An actuator controller for controlling movement of a head through a succession of seek steps according to velocity profiles, comprising:

a memory for storing a master velocity profile for use as a basis for read seek operations and for write seek operations; and a processor, operatively coupled to the memory, for obtaining the master velocity profile from memory, determining whether the type of seek operation to be performed is a read or a write, multiplying the master velocity profile by a read coefficient to produce a read velocity profile for performing the seek when the type of seek operation is a read and multiplying the master velocity profile by a write coefficient to produce a write velocity profile for performing the seek when the type of seek operation is a write, the processor executing the seek operation using the read velocity profile when the seek operation is a read and executing the seek operation using the write velocity profile when the seek operation is a write.

24. A method for providing velocity profiles for moving a head through a succession of seek steps relative to a storage medium, the method comprising the steps of:

storing a master velocity profile;

determining a type of seek operation to be performed, the type of seek operation comprising either a read seek operation or a write seek operation;

obtaining the master velocity profile to produce a read velocity profile or a write velocity profile;

multiplying the obtained master velocity profile by a read coefficient to derive the read velocity profile when a read operation is to be performed and multiplying the obtained master velocity profile by a write coefficient to derive the write velocity profile when a write operation is to be performed;

executing the seek operation using the read velocity profile when the seek operation is a read seek operation and executing the seek operation using the write velocity profile when the seek operation is a write seek operation.

* * * * *